US010438131B1

(12) United States Patent
Pennington et al.

(10) Patent No.: US 10,438,131 B1
(45) Date of Patent: Oct. 8, 2019

(54) SPHERICAL RANDOM FEATURES FOR POLYNOMIAL KERNELS

(71) Applicant: GOOGLE INC., Mountain View, CA (US)

(72) Inventors: Jeffery Pennington, New York, NY (US); Sanjiv Kumar, Jericho, NY (US)

(73) Assignee: GOOGLE LLC, Mountain View, CA (US)

(*) Notice: Subject to any disclaimer, the term of this patent is extended or adjusted under 35 U.S.C. 154(b) by 957 days.

(21) Appl. No.: 14/968,293

(22) Filed: Dec. 14, 2015

(51) Int. Cl.
*G06N 20/00* (2019.01)
*G06N 7/00* (2006.01)
*G06F 17/14* (2006.01)
*G06F 17/16* (2006.01)

(52) U.S. Cl.
CPC .............. *G06N 20/00* (2019.01); *G06F 17/14* (2013.01); *G06F 17/16* (2013.01); *G06N 7/005* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| 6,457,032 | B1 | 9/2002 | Silver |
| 7,299,213 | B2 | 11/2007 | Cristianini |
| 7,663,373 | B1 | 2/2010 | Gard et al. |
| 8,346,687 | B2 * | 1/2013 | Nguyen ............... G06N 99/005 706/12 |
| 2012/0215511 | A1 * | 8/2012 | Sarma ................... G01V 1/308 703/10 |
| 2013/0138428 | A1 * | 5/2013 | Chandramouli ...... G06F 17/274 704/9 |
| 2013/0338496 | A1 * | 12/2013 | Hielscher ............. A61B 5/0064 600/425 |

(Continued)

OTHER PUBLICATIONS

Pennington et al.—Spherical Random Features for Polynomial Kernels—https://dl.acm.org/citation.cfm?id=2969446 (Year: 2015).*

(Continued)

*Primary Examiner* — Scott A. Waldron
*Assistant Examiner* — Viker A Lamardo
(74) *Attorney, Agent, or Firm* — Brake Hughes Bellermann LLP

(57) ABSTRACT

Implementations provide for use of spherical random features for polynomial kernels and large-scale learning. An example method includes receiving a polynomial kernel, approximating the polynomial kernel by generating a nonlinear randomized feature map, and storing the nonlinear feature map. Generating the nonlinear randomized feature map includes determining optimal coefficient values and standard deviation values for the polynomial kernel, determining an optimal probability distribution of vector values for the polynomial kernel based on a sum of Gaussian kernels that use the optimal coefficient values, selecting a sample of the vectors, and determining the nonlinear randomized feature map using the sampled vectors. Another example method includes normalizing a first feature vector for a data item, transforming the first feature vector into a second feature vector using a feature map that approximates a polynomial kernel with an explicit nonlinear feature map, and providing the second feature vector to a support vector machine.

19 Claims, 8 Drawing Sheets

(56) References Cited

U.S. PATENT DOCUMENTS

| | | | | |
|---|---|---|---|---|
| 2014/0002617 A1* | 1/2014 | Zhang | ............... | G01N 15/1463 348/48 |
| 2014/0232862 A1* | 8/2014 | Bala | ................ | G06K 9/6256 348/143 |
| 2015/0317282 A1* | 11/2015 | Avron | ................ | G06F 17/18 702/181 |

OTHER PUBLICATIONS

Bazavan et al.—Fourier Kernel Learning—https://www.semanticscholar.org/paper/Fourier-Kernel-Learning-Bazavan-Li/d7222a38249cdc8b1d2fe693ca37e572262368bb (Year: 2012).*

Vinet et al.—A Bochner Theorem for Dunkl Polynomials—2011—https://arxiv.org/pdf/1011.1457.pdf (Year: 2011).*

William H. Barker—The Spherical Bochner Theorem on Semisimple Lie Groups—1975—https://www.sciencedirect.com/science/article/pii/0022123675900403 (Year: 1975).*

Young et al., "Random Dot Product Graph Models for Social Networks", Proceedings of the 5th International Conference on Algorithms and Models for the Web-Graph, 2007, pp. 138-149.

Cortes et al., "Support-Vector Networks", Machine Learning, vol. 20, 1995, pp. 273-297.

Dai et al., "Scalable Kernel Methods via Doubly Stochastic Gradients", Advances in Neural Information Processing Systems, 2014, pp. 3041-3049.

Fan et al., "LIBLINEAR: A Library for Large Linear Classification", The Journal of Machine Learning Research, vol. 9, Aug. 2008, 30 pages.

Hamid et al., "Compact Random Feature Maps", In Proceedings of the 31st International Conference on Machine Learning, Dec. 2013, pp. 19-27.

Isozaki et al., "Efficient Support Vector Classifiers for Named Entity Recognition", Proceedings of the 19th International Conference on Computational Linguistics, vol. 1, 2002, pp. 1-7.

Joachims, Thorsten, "Training Linear SVMS in Linear Time", Proceedings of the 12th ACM SIGKDD International Conference on Knowledge Discovery and Data Mining, Aug. 2006, pp. 217-226.

Kar et al., "Random Feature Maps for Dot Product Kernels", available online at <http://jmlr.csail.mit.edu/proceedings/papers/v22/kar12/kar12.pdf>, Mar. 26, 2012, 13 pages.

Kim et al., "Face Recognition Using Kernel Principal Component Analysis", IEEE Signal Processing Letters, vol. 9, Issue 2, Feb. 2002, pp. 40-42.

Kummer, Auctore E.E., "De Integralibus Quibusdam Definitis et Seriebus Infinitis", Journal f¨ur die reine and angewandte Mathematik, vol. 17, 1837, pp. 228-242.

Le., et al., "Fastfood—Approximating Kernel Expansions in Loglinear Time", Proceedings of the 30th International Conference on Machine Learning, 2013, 9 pages.

Li et al., "Random Fourier Approximations for Skewed Multiplicative Histogram Kernels", Pattern Recognition, 2010, 10 pages.

Maji et al., "Max-Margin Additive Classifiers for Detection", 12th International Conference on Computer Vision, 2009, pp. 40-47.

Pham et al., "Fast and Scalable Polynomial Kernels via Explicit Feature Maps", Proceedings of the 19th ACM SIGKDD, International Conference on Knowledge Discovery and Data Mining, Aug. 2013, pp. 239-247.

Rahimi et al., "Random Features for Large-Scale Kernel Machines", Advances in Neural Information Processing Systems 20, available online at <http://papers.nips.cc/paper/3182-random-features-for-large-scale-kernel-machines.pdf>, 2007, 8 pages.

Shalev-Shwartz et al., "Pegasos: Primal Estimated Sub-Gradient Solver for SVM", Journal of Mathematical Programming, vol. 127, Issue 1, Mar. 2011, 27 pages.

Sreekanth et al., "Generalized RBF Feature Maps for Efficient Detection", British Machine Vision Conference, 2010, 11 pages.

Vedaldi et al., "Efficient Additive Kernels via Explicit Feature Maps", available at "https://www.robots.ox.ac.uk/~vgg/publications/papers/vedaldi10.pdf," 2011, 14 pages (also published in IEEE Transactions on Pattern Analysis and Machine Intelligence, vol. 34, Issue 3, Mar. 2012, pp. 480-492).

Yang et al., "Random Laplace Feature Maps for Semigroup Kernels on Histograms", IEEE Conference on Computer Vision and Pattern Recognition, 2014, pp. 971-978.

\* cited by examiner

Pseudo Code for Spherical Random Fourier (SRF) Features

Input: A polynomial kernel $K(x,y) = K(z), z = \|x - y\|_2, \|x\|_2 = 1, \|y\|_2 = 1$, with bias $\alpha \geq 2$, order $p \geq 1$, input dimensionality $d$ and feature dimensionality $D$.
Output: A randomized feature map $F(\cdot) : \mathbb{R}^d \to \mathbb{R}^D$ such that $\langle F(x), F(y) \rangle \approx K(x,y)$.

1. Solve $\mathrm{argmin}_{\hat{K}} \int_0^2 dz \left[ K(z) - \hat{K}(z) \right]^2$ for $\hat{k}(w)$, where $\hat{K}(z)$ is the inverse Fourier transform of $\hat{k}(w)$, whose form is given in eqn. (3). Let $p(w) = (2\pi)^{-d/2} \hat{k}(w)$.
2. Draw $D$ iid samples $w_1, \ldots, w_D$ from $p(w)$.
3. Draw $D$ iid samples $b_1, \ldots, b_D \in \mathbb{R}$ from the uniform distribution on $[0, 2\pi]$.
4. $F(x) = \sqrt{\frac{2}{D}} \left[ \cos(w_1^T x + b_1), \ldots, \cos(w_D^T x + b_D) \right]^T$ $$\hat{k}(w) = \max\left( 0, \sum_{i=1}^{N} c_i \left( \frac{1}{\sqrt{2}\sigma_i} \right)^d e^{-w^2/4\sigma_i^2} \right) \quad \text{Eqn. (3)}$$

FIG. 3

SPHERICAL RANDOM FEATURES FOR POLYNOMIAL KERNELS

BACKGROUND

Many systems use large-scale machine learning to accomplish challenging problems such as speech recognition, computer vision, image and sound file searching and categorization, etc. Deep learning of multi-layer neural networks is an effective large-scale approach. Kernel methods, e.g., Gaussian and polynomial kernels, have also been used on smaller-scale problems, but scaling kernel methods has proven challenging.

SUMMARY

Implementations provide a kernel approximation method that is compact, fast, and accurate for polynomial kernels. The method generates nonlinear features for polynomial kernels applied to data on the unit sphere. It approximates the Fourier transform of kernel functions as the positive projection of an indefinite combination of Gaussians and achieves more compact maps compared to previous approaches, especially for higher-order polynomials. The approximation method, also referred to as spherical random Fourier (SRF) features, can be applied to any shift-invariant radial kernel function, whether positive definite or not.

According to one general aspect, a method for generating input for a kernel-based machine learning system includes receiving a polynomial kernel, approximating the polynomial kernel by generating a nonlinear randomized feature map, and storing the nonlinear feature map. Generating the nonlinear randomized feature map includes determining optimal coefficient values and standard deviation values for the polynomial kernel, determining an optimal probability distribution of vector values p(w) for the polynomial kernel based on a sum of N Gaussian kernels that use the optimal coefficient values, selecting a sample of the vectors, and determining the nonlinear randomized feature map using the sample of the vectors. The method may also include generating a vector for a data item in a data source using the nonlinear feature map and providing the vector to the kernel-based machine learning system.

According to one aspect, a computing system includes at least one processor; and memory storing instructions that, when executed by the at least one processor, cause the computing system to perform operations. The operations may include generating an approximation of polynomial kernel as a sum of Gaussian kernels and storing the sample of the vector values as a nonlinear randomized feature map. Generating the approximation of the polynomial kernel as the sum of Gaussian kernels includes limiting the variable of the approximation to [0,2], determining optimal coefficient values for the approximation by determining coefficient values that minimize the difference between the polynomial kernel and the approximation, determining an optimal probability distribution of vector values for the approximation based the optimal coefficient values, and selecting a sample of the vector values. The operations may also include generating input vectors for a kernel-based machine learning system using the nonlinear randomized feature map and training the machine learning system using the input vectors.

According to one aspect, a method includes normalizing a first feature vector for a data item, transforming the first feature vector into a second feature vector using a feature map that approximates a polynomial kernel with an explicit nonlinear feature map, and providing the second feature vector to a support vector machine for use as a training example.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for approximating a Fourier transform of a polynomial kernel function, substantially as shown in and/or described in connection with at least one of the figures, and as set forth more completely in the claims.

One or more of the implementations of the subject matter described herein can be implemented so as to realize one or more of the following advantages. As one example, implementations provide a scalable, non-linear version of features extracted from a data item that give high accuracy for a given task. The features generated using the described subject matter are less rank-deficient, more compact, and achieve better kernel approximation, especially for higher-order polynomials. The resulting predictions made using the SRF features have lower variance and yield better classification accuracy. As another example, the system provides an analytical bound for the SRF approximation paradigm, proving the approximation does not have an adverse effect on performance, especially for large polynomial orders. As another example, the disclosed approximation method reduces model training time, testing time, and memory requirements. As another example, implementations show less feature redundancy, leading to lower kernel approximation error, and more stable performance due to reduced variance.

The details of one or more implementations are set forth in the accompanying drawings and the description below. Other features will be apparent from the description and drawings, and from the claims.

BRIEF DESCRIPTION OF DRAWINGS

FIG. 3 illustrates example pseudo code for Spherical Random Fourier Features, in accordance with disclosed subject matter.

Like reference symbols in the various drawings indicate like elements.

DETAILED DESCRIPTION

Figure 1:
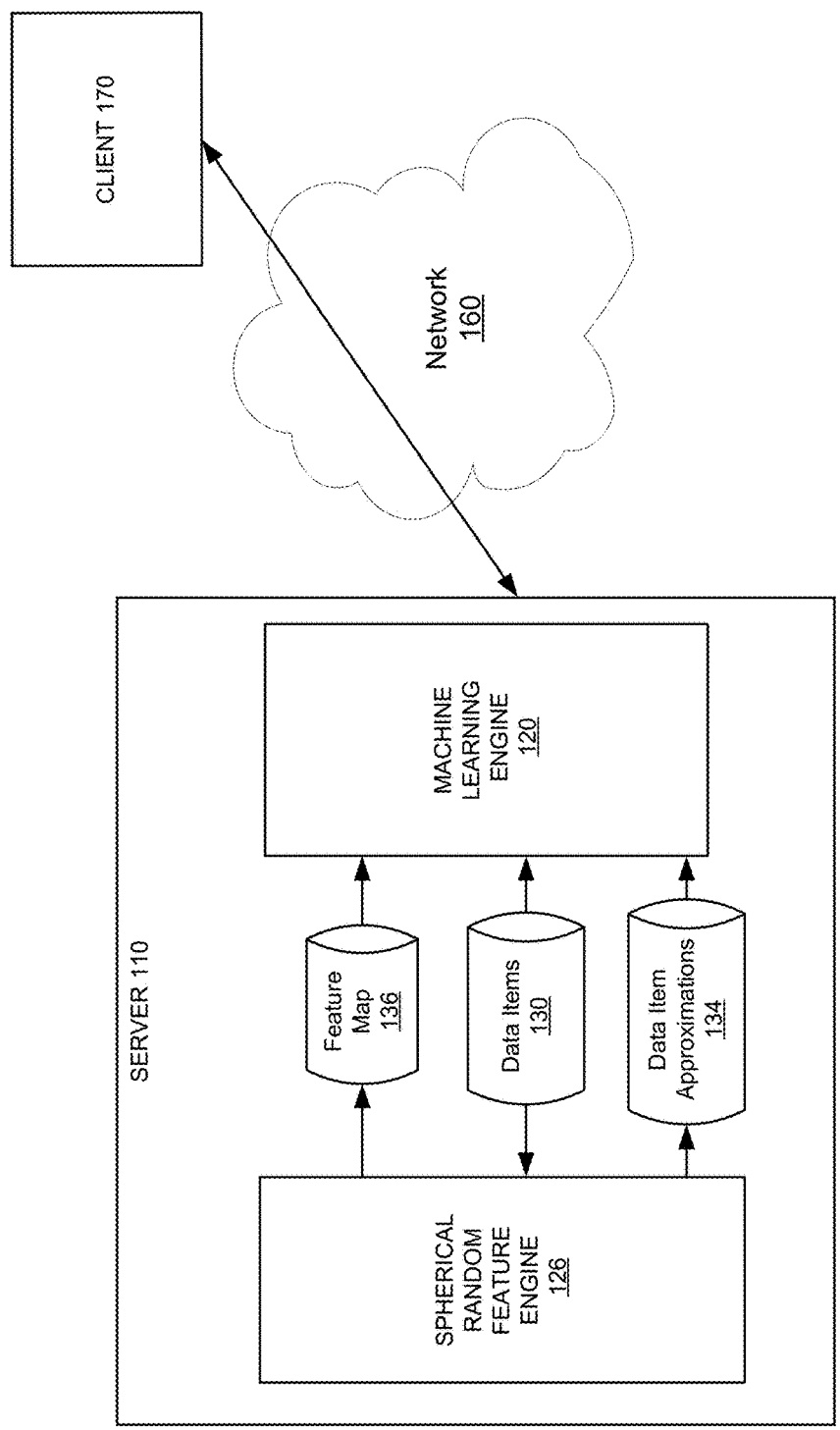
FIG. 1 illustrates an example system in accordance with the disclosed subject matter.

FIG. 1 is a block diagram of a large-scale learning system in accordance with an example implementation. The system 100 may be used to generate a nonlinear map of the input vectors that are, more accurate, and allow computationally efficient training and testing of a SVM or other type of kernel based machine-learning system. The vectors are an approximation of polynomial kernels, which might be used as input to various machine learning problems, such as a classification system, a clustering system, a regression system, etc. For example, a classification system may use the approximations to classify the data items using a linear classifier. The depiction of system 100 in FIG. 1 is described as a server-based classifier system. However, other configurations and applications may be used. For example, system 100 may be a clustering system, a regression system, an anomaly detection system, etc.

Figure 6:
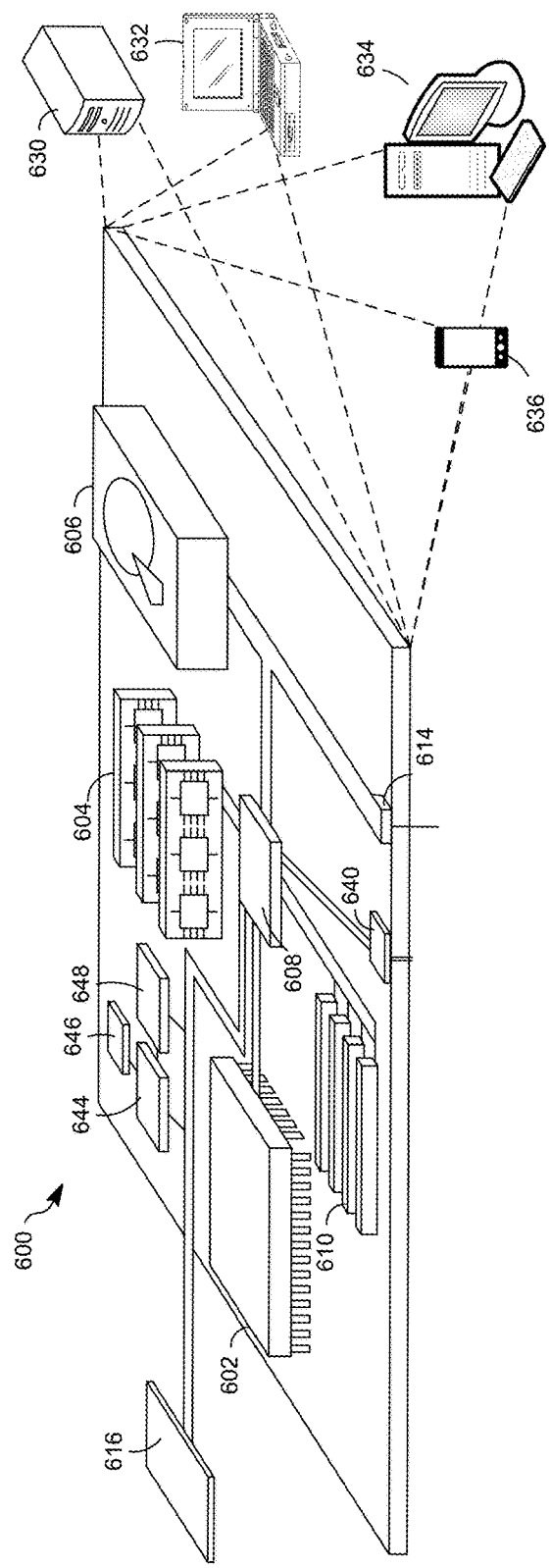
FIG. 6 shows an example of a computer device that can be used to implement the described techniques.
Figure 7:
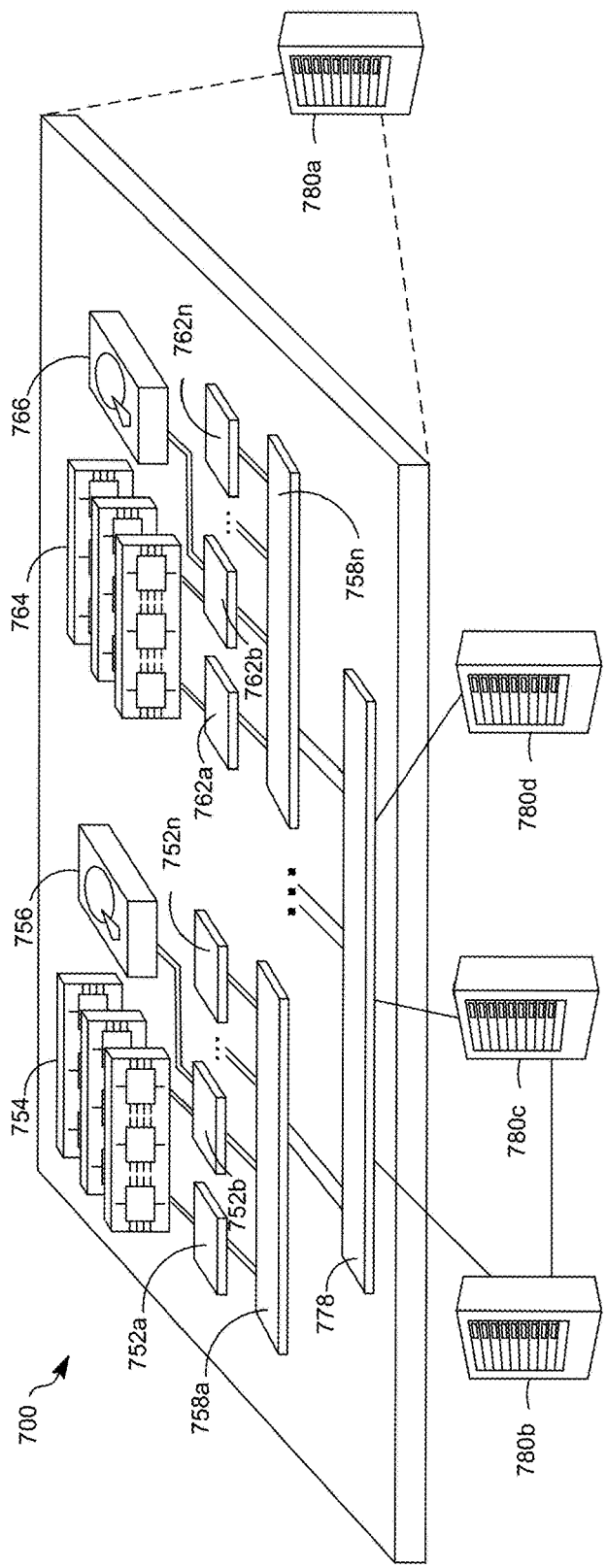
FIG. 7 shows an example of a distributed computer device that can be used to implement the described techniques.

The large-scale learning system 100 may be a computing device or devices that take the form of a number of different devices, for example a standard server, a group of such servers, or a rack server system, such as server 110. In addition, system 100 may be implemented in a personal computer, for example a laptop computer. The server 110 may be an example of computer device 600, as depicted in FIG. 6 or computer device 700, as depicted in FIG. 7.

Although not shown in FIG. 1, the server 110 can include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of server 110.

The modules may include a spherical random feature engine 126 and a machine learning engine 120. The spherical random feature engine 126 may use feature vectors extracted from data items 130 and generate a randomized feature map 136 that produces an approximation of the features, e.g., via a polynomial kernel. A feature vector may be thought of as an array of floating point numbers with a dimensionality of d, or in other words an array with d positions. The data items 130 may be a database, for example of files or search items. For instance, the data items 130 may be any kind of file, such as documents, images, sound files, video files, etc., and the feature vectors may be extracted from the file. The data items 130 may also be database records and the features may be extracted from data related to an item in the database. The system 100 may use a machine learning engine 120 to perform image searches, speech recognition, etc., on the data items 130. The system 100 may use conventional methods to extract the vectors from the data items 130 or may be provided the extracted feature vectors. As some examples, the extracted feature vector may be pixels from an image file in the data items 130 or speech waveforms.

Kernel methods, such as nonlinear support vector machines (SVMs) provide a powerful framework for nonlinear learning system, but they come with significant computational costs. Their training complexity varies from $O(n^2)$ to $O(n^3)$, which becomes prohibitive when the number of training examples n becomes large (e.g., in the millions). Furthermore, the number of support vectors increases linearly with the size of the training data. This slows prediction as well, which has an O(nd) complexity with d-dimensional vectors. Explicit kernel maps are an alternative for large-scale learning because they rely on properties of linear SVMs, which can be trained in O(n) time and applied in O(d) time. With explicit kernel maps, the idea is to determine an explicit nonlinear feature map F(•) such that K(x, y)≈(F(x)·F(y)), where x and y are vectors in the input space (i.e., feature vectors from data items) and F(x) produces a vector that is a nonlinear version of x that gives high accuracy for a given task. One solution for performing this mapping of x to F(x) for Gaussian kernels can be expressed by $$F(x)=\sqrt{2/D}[\cos(w_1^T x+b_1), \ldots, \cos(w_D^T x+b_D)]^T \quad \text{(Equation 1)}.$$

where b is a random shift and D is the dimension of the new feature map F(x).

The problem with using this expression for polynomial kernels is finding the proper values for w that work for a polynomial kernel, where w represents vectors from some distribution. Polynomial kernels are expressed as $K(x, y)=(\langle x, y \rangle +q)^p$ where $\langle x, y \rangle$ is the dot product of two input vectors x and y, q is the bias and p is the degree of the polynomial. The bias is a parameter that trades off the influence of higher-order versus lower-order terms in the polynomial. Approximating polynomial kernels with explicit nonlinear maps is challenging for several reasons. Polynomial kernels conventionally need high dimensional mappings and don't scale for higher degree polynomials. Moreover there are some assumptions built into the Gaussian kernel that do not hold true for polynomial kernels.

Approximation for other types of kernels (e.g., Gaussian kernels) has been accomplished with Bochner's theorem. Bochner's theorem works for kernels where the kernel is shift-invariant (i.e., K(x,y)=K(z) where z is the distance between vectors x and y) and where K(z) is a positive definite function on $\mathbb{R}^d$. But Bochner's theorem cannot be applied to polynomial kernels because polynomial kernels do not satisfy the positive-definiteness prerequisite for the application of Bochner's theorem.

The spherical random feature engine 126 approximates a special case of polynomial kernels, where the input data has been $\ell_2$-normalized. In other words, the input vectors have been normalized to unit $\ell_2$ norm, which ensures the polynomial kernel is not unbounded. Put another way, the input vector x may be normalized so that the sum of the squares of the floating point values equals 1. In some implementations the normalized input vectors may be provided to the spherical random feature engine 126 and in some implementations the spherical random feature engine 126 may perform the normalization. With input normalized, in some implementations, the spherical random feature engine 126 approximates the polynomial kernel defined on $S^{d-1} \times S^{d-1}$ as $$K(x, y) = \left(1 - \frac{\|x-y\|^2}{a^2}\right)^p = \alpha(q + \langle x, y \rangle)^p \quad \text{(Equation 2)}$$

with $$q = \frac{a^2}{2} - 1,$$

$\alpha=(2/a^2)^p$, and p≥1, a≥2. In this equation, x and y are the input vectors, q is the bias, p is the degree of the polynomial, and a and a are scaling constants. The kernel K(x,y) is a shift-invariant radial function of the single variable z=x−y, which can be written as K(x,y)=K(z)=K(z) with z=∥z∥. The Fourier transform of K(z) is not a non-negative function, so a straightforward application of Bochner's theorem to produce Random Fourier Features is impossible. Because z=∥x−y∥=√(2−2cosθ)≤2, the behavior of K(z) for z>2 is undefined and arbitrary. A Fourier transform requires an integration over all values of z, therefore the spherical random feature engine 126 may map K(z) to 0 where z is greater than 2, thus limiting cases where the system calculates the approximation for K(z) to [0,2].

However, it is impossible for the system to construct a positive integrable k(w) whose inverse Fourier transform $\hat{K}(z)$ equals K(z) exactly on [0,2]. Rather, the spherical random feature engine 126 finds an inverse Fourier transform $\hat{K}(z)$ that is a good approximation of K(z) on [0,2], which is sufficient because the system approximates the inverse Fourier transform $\hat{K}(z)$ by Monte Carlo integration. The spherical random feature engine 126 approximates K(z) as a series of N Gaussians $\hat{K}(z)$, (e.g., $$\sum_{i=1}^{N} c_i e^{-\sigma_i^2 z^2}$$

The projection ensures that the inverse transform can be performed with Monte Carlo integration. The system may allow the coefficient values c in the Gaussians to become negative to increase the accuracy of the approximation. But doing this enables the Fourier transform, which is also a sum of Gaussians, to become negative. The spherical random feature engine 126 circumvents this problem by mapping the negative values to zero. The approximation of the randomized feature map for the polynomial kernel may be thus expressed as the inverse Fourier transform $\hat{K}(z)$ of $$\hat{k}(w) = \max\left(0, \sum_{i=1}^{N} c_i \left(\frac{1}{\sqrt{2}\,\sigma_i}\right)^d e^{-w^2/4\sigma_i^2}\right) \quad \text{(Equation 3)}$$

where N is the number of Gaussians (e.g., 10), $c_i$ represent coefficient values, $\sigma_i$ are standard deviation values and e is Euler's number. $\hat{k}(w)$ may also be referred to as the Fourier transform of the approximate kernel function.

The spherical random feature engine 126 may determine the coefficient values and standard deviation values by optimizing the mean squared error between $\hat{K}(z)$ and K(z) given a polynomial kernel K(x,y)=K(z), where z=∥x−y∥$_2$, ∥x∥$_2$=1, ∥y∥$_2$=1. The Polynomial kernel K(x,y) is parameterized by a scaling constant a≥2 and an order p≥1. The scaling constant and order define the polynomial kernel. The input feature vectors x and y may have a dimensionality of d (e.g., the dimensionality of the feature vectors from data items 130). Put another way, the spherical random feature engine 126 may solve $$\operatorname{argmin}_{\hat{k}} \int_0^2 dz [K(z) - \hat{K}(z)]^2 \quad \text{(Equation 4)}$$

where $\hat{K}(z)$ is the inverse Fourier transform of $\hat{k}(w)$, which is represented by Equation 3. In other words, the spherical random feature engine 126 minimizes the integral of Equation 4 in order to obtain optimal coefficient values $c_i$ and standard deviation values $\sigma_i$. With the optimal coefficient values and standard deviation values (i.e., $c_i$ and $\sigma_i$) identified, the spherical random feature engine 126 may use them to determine a probability distribution p(w), using the relation p(w)=$(2\pi)^{-d/2}\hat{k}$(w) and Equation 3. The spherical random feature engine 126 may sample D vector values w from the probability distribution p(w). D represents the number of dimensions in the approximated feature vector (e.g., F(x)) and can be adjusted to find a balance between result quality and computation time. For example, the larger D is the better the results will be but the longer it will take to compute the results. Thus, D may be considered a parameter that an administrator can adjust to achieve desired balance between cost and quality results.

The spherical random feature engine 126 can use the randomly-selected vectors w to solve Equation 1 given a particular input vector x. Put another way, once the values for vectors w are determined, the spherical random feature engine 126 may use the values of w in Equation 1 to determine F(x), i.e., a non-linear approximation of the input vector x. In other words, the spherical random feature engine 126 determines the values for w that enable the system to generate the randomized feature map F(•) (i.e., feature map 136) such that K(x,y) (F(x)·F(y)). Accordingly, the system may store the optimal values of w as part of the spherical randomized feature map 136.

In some implementations, once the system 100 has determined the values of w that make up the randomized feature map F(•), the system may use the spherical random feature engine 126 to generate data item approximations 134. The data item approximations 134 represent non-linear approximations of input vectors for data items 130. In other words, the data item approximations 134 may be the result of applying the feature map 136 to an input vector x, e.g., the result of F(x) for a particular data item. In some implementations, the system 100 may calculate a nonlinear approximation for each data item in data items 130. This enables the machine learning engine 120 to access the data item approximations 134 for comparison with a query item quickly. In other implementations, the spherical random feature engine 126 may generate the data item approximations 134 in response to a query. The query item is also a data item and the system may use the spherical random feature engine 126 to generate a data item approximation 134 for the query item.

The system 100 may also include machine learning engine 120. The machine learning engine 120 may be any type of kernel-based machine-learning system, such as a long short-term memory (LSTM) neural network, feed-forward neural network, a support vector machine (SVM) classifier etc., that can predict one thing given the data item approximations 134 as input. For example, the machine learning engine 120 may take as input a data item and may use the feature map 136 to generate a transformation of the data item that is used to provide, as output, a classification for the data item. The data item can be an image and the classification may be a label for the image or a description of something identified in the image. The data item can also be sound file and the classification may be a word or words recognized in the sound file. In some implementations, the machine learning engine 120 may use dot product similarity between data item approximations to determine the label. Of course these are given as examples only and implementations are not limited to classification of input. The output from the machine learning engine 120 can include other tasks such as clustering, regression analysis, anomaly detection, prediction, etc. The vectors generated using feature map 136 can be used as input to any machine learning problem, whether for training or for inference. When the machine-learning engine 120 is in a training mode, input vectors may be positive training examples (i.e., examples of a correct inference) or negative training examples (e.g., examples of an incorrect inference). When the machine learning engine 120 is in an inference mode, the machine learning engine 120 provides a prediction for the input vector. For example, the output of the machine learning engine 120 may be one or more classifications, one or more cluster assignments, the absence or presence of an anomaly, etc., for the data item for which the vector was generated. The machine learning engine 120 may use any input that can be classified, clustered, or otherwise analyzed.

The server 110 may include or be in communication with a search engine (not shown). For example, the search engine may be configured to use the machine learning engine 120 to identify data items 130 that are responsive to a query, for example provided by client 170, and to provide a search result in response to the query.

Large-scale learning system 100 may be in communication with client(s) 170 over network 160. Clients 170 may allow a user to provide query to the machine learning engine 120 (e.g., via a search engine) and to receive a corresponding search result. Client 170 may also be used to tune the parameters of the spherical random feature engine 126, such as the dimensionality of the features generated by the feature map 136 and the polynomial kernel parameters (e.g., bias and degree). Network 160 may be for example, the Internet or the network 160 can be a wired or wireless local area network (LAN), wide area network (WAN), etc., implemented using, for example, gateway devices, bridges, switches, and/or so forth. Via the network 160, the server 110 may communicate with and transmit data to/from clients 170.

Large-scale learning system 100 represents one example configuration and other configurations are possible. In addition, components of system 100 may be combined or distributed in a manner differently than illustrated. For example, in some implementations one or more of the machine learning engine 120 and the spherical random feature engine 126 may be combined into a single module or engine. In addition, components or features of the machine learning engine 120, the spherical random feature engine 126, or a search engine may be distributed between two or more modules or engines, or even distributed across multiple computing devices.

Figure 2:
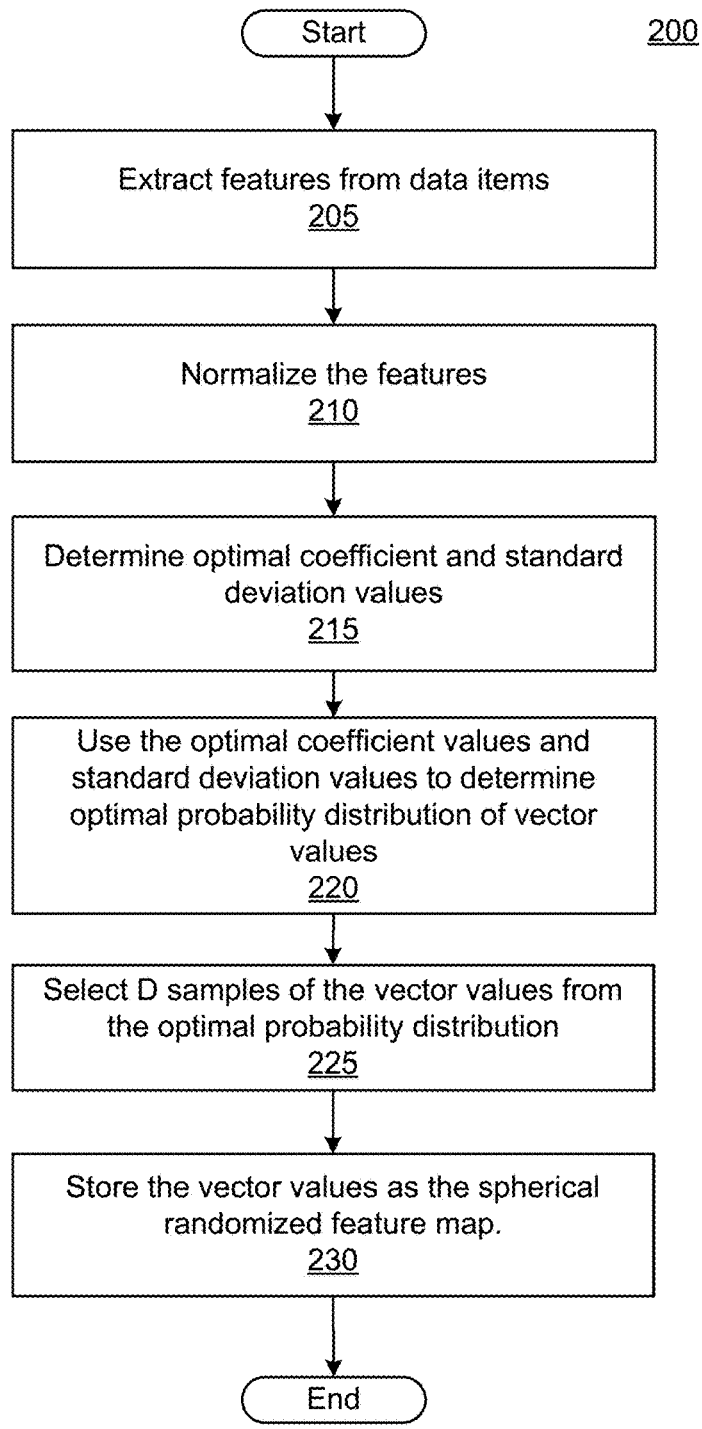
FIG. 2 illustrates a flow diagram of an example process for generating a feature map for approximation of a polynomial kernel, according to an implementation.

FIG. 2 illustrates a flow diagram of an example process 200 for generating an explicit feature map for approximation of a polynomial kernel, according to an implementation. Process 200 may be performed by a large-scale learning system, such as system 100 of FIG. 1. Process 200 is an example of approximating a polynomial kernel via random sampling performed by spherical random feature engine 126 of FIG. 1. Process 200 may begin with the large-scale learning system extracting features from a data item (205). For example, in a 256×256 image the feature vector may have dimensionality of 65,536. The features may be extracted via conventional methods. The system may normalize the features (210) to unit $\ell_2$ norm. Features that have been $\ell_2$-normalized have a predefined length of one (1). The system may then determine optimal coefficient and standard deviation values (215) for the approximation. The approximation for the Fourier transform of the polynomial kernel may be expressed as $$\hat{k}(w) = \max\left(0, \sum_{i=1}^{N} c_i \left(\frac{1}{\sqrt{2}\,\sigma_i}\right)^d e^{-w^2/4\sigma_i^2}\right).$$ (Equation 3)

In other words, the approximation for the polynomial kernel is based on the inverse Fourier transform of a sum of N Gaussians, where any negative Fourier transform values are mapped to zero. The system may optimize the coefficient values by solving $$\operatorname{argmin}_{\hat{k}} \int_0^2 dz [K(z) - \hat{K}(z)]^2,$$

where $\hat{K}(z)$ is the inverse Fourier transform of Equation 3 and dz refers to the standard mathematical notation defining the integral. The system may evaluate the inverse Fourier Transform $\hat{K}(z)$ numerically by performing a one dimensional numerical integral expressed as $$\hat{K}(z) = \int_0^\infty dw\, w \hat{k}(w) \left(\frac{w}{z}\right)^{\frac{d}{2}-1} J_{\frac{d}{2}-1}(wz)$$

where z is the distance between two input vectors x and y and $$J_{\frac{d}{2}-1}$$

is the Bessel function of the first kind of order $$\frac{d}{2} - 1.$$

Performing the one dimensional numerical integral may be well approximated using a fixed-width grid in w and z and can be computed using a single matrix multiplication. In determining the optimal coefficient values, the system may optimize the mean squared error between K(z) and its approximation $\hat{K}(z)$. The mean squared error may be represented as $$L = \frac{1}{2} \int_0^2 dz [K(z) - \hat{K}(z)]^2,$$

which defines an optimal probability distribution p(w) through Equation 3 and the relation $p(w) = (2\pi)^{-d/2} \hat{k}(w)$. The upper bound for the error approximating function is $$L \leq \frac{105}{4096} \sqrt{\frac{\pi}{2}} \frac{a}{p^{5/2}}.$$

To find the optimal probability distribution of vector values p(w), the system may use the optimal coefficient values and the standard deviation values (220), e.g., values for w in Equation 3. Put another way, the system may use the coefficient values and standard deviation values to extract the optimal probability distribution p(w) using Equation 3. The system may select D vector values w from the optimal probability distribution via random sampling (225), where D is a parameter that represents the dimensions in the resulting approximation of the input feature vector (i.e., F(x)). The system may store the selected vector values as the randomized feature map (230). The sampled vector values (e.g., w) are used to determine the explicit mapping, i.e., $F(x) = \sqrt{2/D}[\cos(w_1^T x + b_1), \ldots, \cos(w_D^T x + b_D)]^T$, which is a representation of the spherical randomized feature map and produces the non-linear approximation of the vector x. This non-linear approximation is less rank-deficient, more compact, and has high kernel approximation, especially for higher order polynomials. Process 200 then ends.

FIG. 3 illustrates example pseudo code for Spherical Random Fourier Features, in accordance with disclosed subject matter. The pseudo code of FIG. 3 is an example of the steps performed by the spherical random feature engine 126 of FIG. 1 and another representation of process 200 of FIG. 2.

Figure 4:
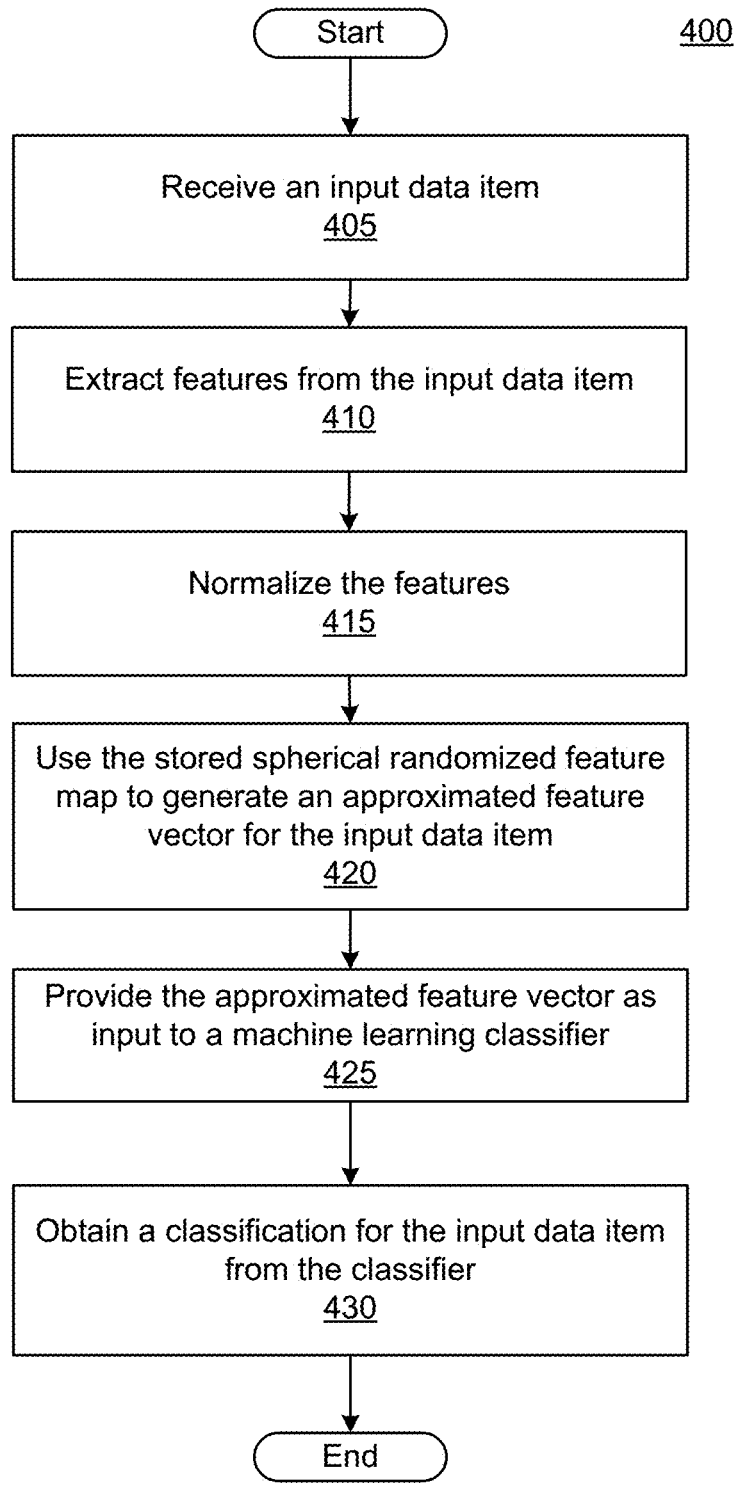
FIG. 4 is a flowchart of an example process for using spherical random features with a classification engine, in accordance with disclosed subject matter.

FIG. 4 is a flowchart of an example process 400 for using spherical random features with a classification engine, in accordance with disclosed subject matter. Process 400 may be performed by a large-scale learning system, such as system 100 of FIG. 1. Process 400 is an example of transforming an input vector to a second vector, which is a non-linear approximation of an input vector, using spherical random feature engine 126 of FIG. 1. Process 400 may begin with the large-scale learning system receiving an input data item (405). The input data item may be any item from which a feature vector can be extracted. Examples include images, documents, video files, sound files, entities with metadata, user profiles, etc. The system may extract features from the input data item (410) using conventional techniques. The system may normalize the feature vector (415) to unit $\ell_2$ norm. The system may then use the spherical randomized feature map (e.g., generated as part of process 200 of FIG. 2) to generate an approximated feature vector for the input data item (420). The approximated feature vector may be a non-linear approximation with a different dimensionality than the input feature vector.

The system may provide the approximated feature vector as input to a classifier (425). The classifier may have access to a large store of data items. The data items may already have corresponding approximated feature vectors (e.g., approximated data items 134 of FIG. 1) or may initiate generation of approximated feature vectors for the data items. In some implementations, the classifier may calculate a dot product between the approximated feature vectors for the input data item and the store of data items. In some implementations, the classifier may use the dot product to determine a label, classification, etc. for the input data item. For example, the classifier may classify an image as an animal, person, building, etc. In some implementations, the classifier may determine items in the data store that are most similar to the input data item. Thus, the system may obtain a classification for the input data item from the classifier (430). Process 400 then ends.

The process of FIG. 4 is one example of using spherical random features. The feature map (e.g. output from the spherical random feature engine 126) can be used in any machine learning application, including but not limited to clustering, regression, anomaly analysis, etc. Thus, for example, an alternate step 430 may include obtaining a cluster assignment for the input data item, obtaining a regression analysis for the input data item. etc. Moreover, the spherical random features may be used as training examples for the machine learning classifier, e.g., in a training mode that takes place before process 400 is performed.

Figure 5A:
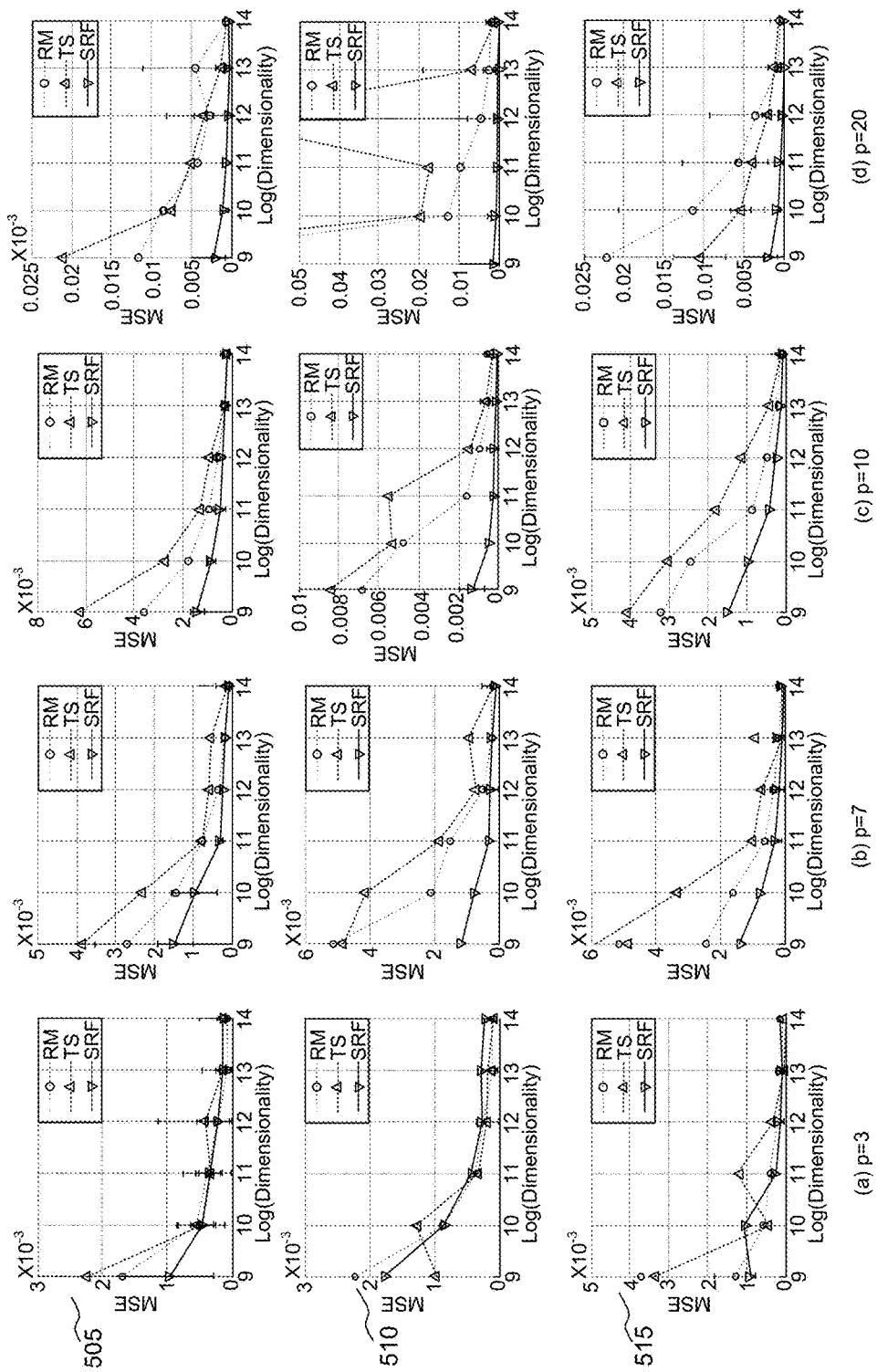
FIGS. 5A to 5C demonstrate benefits provided by disclosed implementations.
Figure 5B:
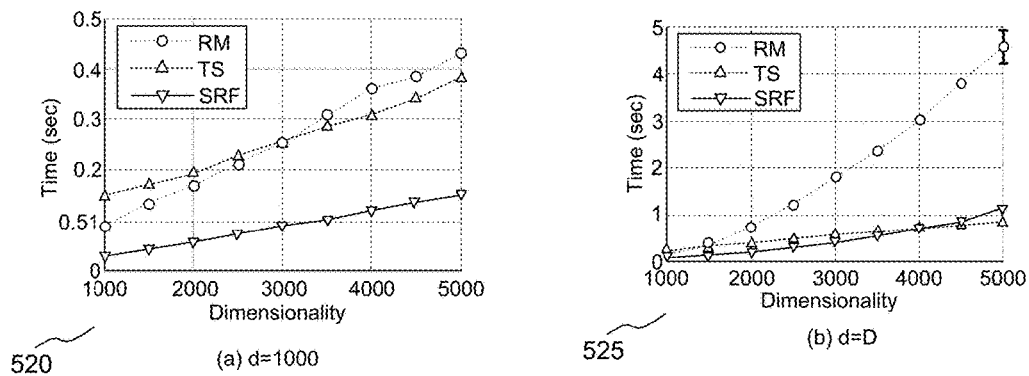
Figure 5C:
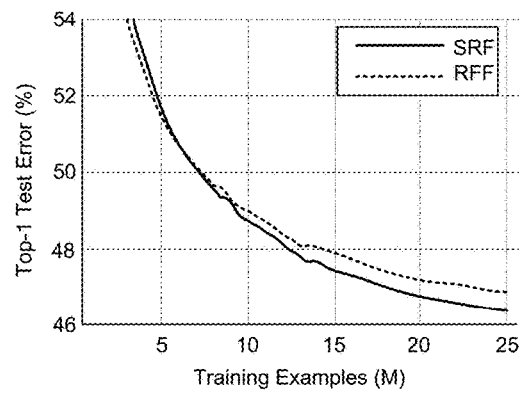

FIGS. 5A to 5C demonstrate benefits provided by disclosed implementations. FIGS. 5A and 5C illustrate comparisons between spherical random features (SRF) kernel approximations, which are generated by disclosed implementations, and other polynomial kernel approximations, namely Random Maclaurin (RM) and Tensor Sketch (TS). FIG. 5A illustrates a comparison of the mean squared error (MSE) as a function of dimensionality D of nonlinear maps of different datasets with various polynomial orders (p). The first row 505 represents results on a dataset with 7,000+ training examples, 2000+ testing examples and a dimension d of 256. The second row 510 represents results on a dataset with 6,000 training examples, 1000 testing examples and a dimension d of 5,000. The third row 515 represents results on a dataset with 32,500+ training examples, 16,000+ testing examples, and a dimensionality d of 123. FIG. 5A demonstrates that SRF kernel approximations have a much lower MSE at lower dimensionalities D than the other methods. As indicated above, a lower dimensionality D makes processing time faster. Thus, SRF kernel approximation achieves higher accuracy with less processing time and a smaller approximation (due to lower dimensionality).

FIG. 5B illustrates computational efficiency of SRF kernel approximations. Both RM and SRF have computational complexity of O(ndD) whereas TS has the computational complexity O(np(d+D log D)), where D is the number of nonlinear maps, n is the number of samples, d is the original feature dimension, and p is the polynomial order. Because SRF does not depend on p, it is more efficient for higher-order polynomials. Moreover, there is little computational overhead involved in SRF approximations, so it outperforms TS for practical values of D, even though it is asymptotically inferior. Graph 520 of FIG. 5B illustrates computational time to generate a randomized feature map for 1,000 random samples with p=3 and d is 1000. Graph 525 of FIG. 5B illustrates the computational time when d=D. The graphs of FIG. 5B illustrates SRF is faster than either of the other two approximations until d becomes large (e.g., d=D=4000).

FIG. 5C illustrates the scalability of SRF approximations. The graph of FIG. 5C was generated on a dataset with 1.3 million data items and represents the learning curve. The data items are 256×256 color images (i.e., d=65,535) from 1000 classes. The training illustrated in graph of FIG. 5C uses a stochastic gradient method proposed by Dai et al., "Scalable kernel methods via doubly stochastic gradients," in Advances in Neural Information Processing Systems, pages 3041-2049, 2014. The stochastic gradient method utilizes two unbiased stochastic approximations, one using random training points and the other using random features associated with the kernel. The graph demonstrates the difference with an RFF kernel and the SRF kernel approximation having similar parameters and p=10. The two methods are comparable, demonstrating that the SRF kernel approximation can be successfully scaled to large datasets.

FIG. 6 shows an example of a generic computer device 600, which may be server 110, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be server 110 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

According to one aspect, a method for generating input for a kernel-based machine learning system includes receiving a polynomial kernel, approximating the polynomial kernel by generating a nonlinear randomized feature map, and storing the nonlinear feature map. Generating the nonlinear randomized feature map includes determining optimal coefficient values and standard deviation values for the polynomial kernel, determining an optimal probability distribution of vector values p(w) for the polynomial kernel based on a sum of N Gaussian kernels that use the optimal coefficient values, selecting a sample of the vectors, and determining the nonlinear randomized feature map using the sample of the vectors. The method may also include generating a vector for a data item in a data source using the nonlinear feature map and providing the vector to the kernel-based machine learning system.

These and other aspects can include one or more of the following features. For example, generating the vector for the data item can include extracting a set of features from the data item and normalizing the set of features, wherein the method further includes receiving a predicted label for the data item from the machine learning system. As another example, the data item includes a first data item and the method also includes using the nonlinear feature map to generate a second vector for a second data item in the data source and using respective vectors to compute a dot product similarity between the first data item and the second data item. As another example, the data item may be an image, a speech recording, or a video file.

As another example, determining optimal coefficient values can include solving $$\operatorname{argmin}_{\hat{K}} \int_0^2 dz [K(z) - \hat{K}(z)]^2,$$

of K(z), and z is the variable of the polynomial kernel. In some implementations, the polynomial kernel K(z) is expressed as $$K(x, y) = \left(1 - \frac{\|x-y\|^2}{a^2}\right)^p = \alpha(q + \langle x, y \rangle)^p,$$

where alpha is $(2/a^2)^p$, q is the bias, p is the order of the polynomial, and a is a scaling parameter. In some implementations, $\hat{K}(z)$ is the inverse Fourier Transform of a positive integrable function of the vector w, $$\hat{k}(w) = \max\left(0, \sum_{i=1}^{N} c_i \left(\frac{1}{\sqrt{2}\,\sigma_i}\right)^d e^{-w^2/4\sigma_i^2}\right),$$

parameterized by coefficient values $c_i$ and standard deviation values $\sigma_i$ such that $\hat{K}(z)$ is a good approximation of K(z) on [0,2].

As another example, an approximation error of the nonlinear randomized feature map may decay at a rate of $O(p^{-2.5})$ where p is the order of the polynomial kernel. As another example, determining the optimal probability distribution p(w) through the relation $p(w)=(2\pi)^{-d/2}\hat{k}(w)$ can include using the optimal coefficient values $c_i$ and standard deviation values $\sigma_i$ to obtain $$\hat{k}(w) = \max\left(0, \sum_{i=1}^{N} c_i \left(\frac{1}{\sqrt{2}\,\sigma_i}\right)^d e^{-w^2/4\sigma_i^2}\right),$$

where $\hat{k}(w)$ is a positive integrable function of the vector w and whose inverse Fourier Transform R(z) is a good approximation of K(z) on [0,2]. As another example, computing the nonlinear randomized feature map using the samples may include using the optimal probability distribution of vector values p(w) to solve $F(x) = \sqrt{2/D}[\cos(w_1^T x + b_1), \ldots, \cos(w_D^T x + b_D)]^T$ where F(x) is the nonlinear feature map, 142, are D random vectors sampled from p(w), and $b_i$ are D random biases. As another example, in the weighted sum of N Gaussian functions, negative Fourier transform values may be mapped to zero.

According to one aspect, a computing system includes at least one processor; and memory storing instructions that, when executed by the at least one processor, cause the computing system to perform operations. The operations may include generating an approximation of polynomial kernel as a sum of Gaussian kernels and storing the sample of the vector values as a nonlinear randomized feature map. Generating the approximation of the polynomial kernel as the sum of Gaussian kernels includes limiting the variable of the approximation to [0,2], determining optimal coefficient values for the approximation by determining coefficient values that minimize the difference between the polynomial kernel and the approximation, determining an optimal probability distribution of vector values for the approximation based the optimal coefficient values, and selecting a sample of the vector values. The operations may also include generating input vectors for a kernel-based machine learning system using the nonlinear randomized feature map and training the machine learning system using the input vectors.

These and other aspects can include one or more of the following features. For example, the sum of Gaussian kernels may be expressed as $$\max\left(0, \sum_{i=1}^{N} c_i \left(\frac{1}{\sqrt{2}\,\sigma_i}\right)^d e^{-w^2/4\sigma_i^2}\right),$$

where $c_i$ represents the optimal coefficient values, $\sigma_i$ represents the optimal standard deviation values, N represents the amount of Gaussian kernels in the sum, w represents the sampled vector values, d is the dimension of an input vector for the polynomial kernel. In some implementations, the approximation is an inverse Fourier Transform of the sum of Gaussian kernels and is a good approximation of the polynomial kernel on [0,2]. As another example, as part of generating the approximation, the operations can also include mapping negative Fourier transform values to zero in the sum of Gaussian kernels. As another example, minimizing the difference between the polynomial kernel and the approximation may be represented as $$\operatorname{argmin}_{\hat{K}} \int_0^2 dz [K(z) - \hat{K}(z)]^2,$$

where K(z) is the polynomial kernel, K̂(z) is the approximation, and z is the variable of the polynomial kernel. In some implementations, the approximation can be evaluated as $$\int_0^\infty dw w \hat{k}(w) \left(\frac{w}{z}\right)^{\frac{d}{2}-1} J_{\frac{d}{2}-1}(wz),$$

where $$J_{\frac{d}{2}-1}$$

is the Bessel function of the first kind of order $$\frac{d}{2}-1$$

and k̂(w) is the Fourier transform of the kernel function.

According to one aspect, a method includes normalizing a first feature vector for a data item, transforming the first feature vector into a second feature vector using a feature map that approximates a polynomial kernel with an explicit nonlinear feature map, and providing the second feature vector to a support vector machine for use as a training example.

These and other aspects can include one or more of the following features. For example, the explicit nonlinear feature map may approximate a Fourier transform of the polynomial kernel as a positive projection of a combination of Gaussians. As another example, the combination of Gaussians is expressed $$\max\left(0, \sum_{i=1}^N c_i \left(\frac{1}{\sqrt{2}\,\sigma_i}\right)^{d} e^{-w^2/4\sigma_i^2}\right),$$

as where $c_i$ represents optimal coefficient values, $\sigma_i$ represents the optimal standard deviation values, N represents the number of Gaussians in the combination, w represents a vector, d is the dimension of the first feature vector. In some implementations, the method includes determining the optimal coefficient and standard deviation values by determining values that minimize differences between the polynomial kernel and an inverse Fourier transform of the combination of Gaussians for values of the polynomial variable ranging from zero to two.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for generating input for a kernel-based machine learning system comprising:
   receiving a polynomial kernel;
   approximating the polynomial kernel by generating a nonlinear randomized feature map by:
      determining optimal coefficient values and standard deviation values for the polynomial kernel,
      determining an optimal probability distribution of vector values p(w) for the polynomial kernel based on a sum of N Gaussian kernels that use the optimal coefficient values, selecting a sample of the vectors, and
      determining the nonlinear randomized feature map using the sample of the vectors;
   storing the nonlinear feature map;
   generating a vector for a data item in a data source using the nonlinear feature map;
   using the vector as input to the kernel-based machine learning system for training.

2. The method of claim 1, wherein generating the vector for the data item includes:
   extracting a set of features from the data item; and
   normalizing the set of features, and
   wherein the method further includes receiving a predicted label for the data item from the machine learning system.

3. The method of claim 1, wherein the data item includes a first data item and the method further comprises:
   using the nonlinear feature map to generate a second vector for a second data item in the data source; and using respective vectors to compute a dot product similarity between the first data item and the second data item.

4. The method of claim 1, wherein the data item is an image.

5. The method of claim 1, wherein the data item is a speech recording.

6. The method of claim 1, wherein the data item is a video file.

7. The method of claim 1, wherein determining optimal coefficient values includes:
solving $$\mathrm{argmin}_{\hat{K}} \int_0^2 dz [K(z) - \hat{K}(z)]^2,$$

where K(z) is the polynomial kernel, $\hat{K}(z)$ is the approximation of K(z), and z is the variable of the polynomial kernel.

8. The method of claim 7, wherein the polynomial kernel K(z) is expressed as $$K(x, y) = \left(1 - \frac{\|x-y\|^2}{a^2}\right)^p = \alpha(q + \langle x, y \rangle)^p,$$

where alpha is $(2/a^2)^p$, q is the bias, p is the order of the polynomial, and a is a scaling parameter.

9. The method of claim 7, wherein $\hat{K}(z)$ is the inverse Fourier Transform of a positive integrable function of the vector w, $$\hat{k}(w) = \max\left(0, \sum_{i=1}^{N} c_i \left(\frac{1}{\sqrt{2}\,\sigma_i}\right)^d e^{-w^2/4\sigma_i^2}\right),$$

parameterized by coefficient values $c_i$ and standard deviation values $\sigma_i$ such that $\hat{K}(z)$ is an approximation of K(z) on [0,2].

10. The method of claim 1, wherein an approximation error of the nonlinear randomized feature map decays at a rate of $O(p^{-2.5})$ where p is the order of the polynomial kernel.

11. The method of claim 1, wherein determining the optimal probability distribution p(w) through the relation $p(w)=(2\pi)^{-d/2}\hat{k}(w)$ includes using the optimal coefficient values $c_i$ and standard deviation values $\sigma_i$ to obtain $$\hat{k}(w) = \max\left(0, \sum_{i=1}^{N} c_i \left(\frac{1}{\sqrt{2}\,\sigma_i}\right)^d e^{-w^2/4\sigma_i^2}\right),$$

where $\hat{k}(w)$ is a positive integrable function of the vector w and whose inverse Fourier Transform $\hat{K}(z)$ is an good approximation of K(z) on [0,2].

12. The method of claim 1, wherein computing the nonlinear randomized feature map using the samples includes using the optimal probability distribution of vector values p(w) to solve $F(x)=\sqrt{2/D}[\cos(w_1^T x+b_1), \ldots, \cos(w_D^T x+b_D)]^T$ where F(x) is the nonlinear feature map, are D random vectors sampled from p(w), and $b_i$ are D random biases.

13. The method of claim 1, wherein in the weighted sum of N Gaussian functions, negative Fourier transform values are mapped to zero.

14. A computing system comprising:
at least one processor; and
memory storing instructions that, when executed by the at least one processor, cause the computing system to perform operations including:
generating an approximation of polynomial kernel as a sum of Gaussian kernels by:
limiting the variable of the approximation to [0,2],
determining optimal coefficient values for the approximation by determining coefficient values that minimize the difference between the polynomial kernel and the approximation,
determining an optimal probability distribution of vector values for the approximation based the optimal coefficient values,
selecting a sample of the vector values, and
storing the sample of the vector values as a nonlinear randomized feature map;
generating input vectors for a kernel-based machine learning system using the nonlinear randomized feature map; and
training the machine learning system using the input vectors.

15. The system of claim 14, wherein the sum of Gaussian kernels is expressed as $$\max\left(0, \sum_{i=1}^{N} c_i \left(\frac{1}{\sqrt{2}\,\sigma_i}\right)^d e^{-w^2/4\sigma_i^2}\right)$$

where $c_i$ represents the optimal coefficient values, $\sigma_i$ represents the optimal standard deviation values, N represents the amount of Gaussian kernels in the sum, w represents the sampled vector values, d is the dimension of an input vector for the polynomial kernel.

16. The system of claim 15, where the approximation is an inverse Fourier Transform of the sum of Gaussian kernels and is a good approximation of the polynomial kernel on [0,2].

17. The system of claim 14, wherein as part of generating the approximation, the operations also include mapping negative Fourier transform values to zero in the sum of Gaussian kernels.

18. The system of claim 14, wherein minimizing the difference between the polynomial kernel and the approximation is represented as $\mathrm{argmin}_{\hat{K}} \int_0^2 dz[K(z)-\hat{K}(z)]^2$, where K(z) is the polynomial kernel, $\hat{K}(z)$ is the approximation, and z is the variable of the polynomial kernel.

19. The system of claim 18, wherein the approximation can be evaluated as $$\int_0^\infty dw\, w\hat{k}(w)\left(\frac{w}{z}\right)^{\frac{d}{2}-1} J_{\frac{d}{2}-1}(wz),$$

where $$J_{\frac{d}{2}-1}$$

is the Bessel function of the first kind of order $$\frac{d}{2} - 1$$

and $\hat{k}(w)$ is the Fourier transform of the kernel function.

\* \* \* \* \*

UNITED STATES PATENT AND TRADEMARK OFFICE
CERTIFICATE OF CORRECTION

PATENT NO. : 10,438,131 B1
APPLICATION NO. : 14/968293
DATED : October 8, 2019
INVENTOR(S) : Pennington et al.

Page 1 of 1

It is certified that error appears in the above-identified patent and that said Letters Patent is hereby corrected as shown below:

In the Claims

Column 17, Claim 11, Line 59, delete "an good" and insert --an--, therefor.

Column 17, Claim 12, Line 65, delete "are" and insert --$w_i$ are--, therefor.

Column 18, Claim 15, Lines 31-34, delete "$max(0, \sum_{i=1}^{N} c_i(\frac{1}{\sqrt{2}\sigma_i})^d e^{-w^2/4\sigma_i^2})$," and insert --$max(0, \sum_{i=1}^{N} c_i(\frac{1}{\sqrt{2}\sigma_i})^d e^{-w^2/4\sigma_i^2})$,--, therefor.

Signed and Sealed this
Tenth Day of December, 2019

Andrei Iancu
*Director of the United States Patent and Trademark Office*